United States Patent [19]

Teramachi

[11] Patent Number: 4,899,998
[45] Date of Patent: Feb. 13, 1990

[54] ROTATIONAL POSITIONING DEVICE

[76] Inventor: Hiroshi Teramachi, 34-8, Higashitamagawa 2-chome, Setagaya-ku, Tokyo, Japan

[21] Appl. No.: 268,925

[22] Filed: Nov. 9, 1988

[30] Foreign Application Priority Data

Nov. 10, 1987 [JP] Japan .............................. 62-170757[U]

[51] Int. Cl.$^4$ ............................................... B23Q 3/18
[52] U.S. Cl. ...................................................... 269/63
[58] Field of Search .................. 188/171, 173; 408/71; 409/221; 279/5; 269/63, 57, 59; 310/77, 76; 318/370, 372; 192/90, 93 R, 89 A, 70.24, 70.27, 70.3

[56] References Cited

U.S. PATENT DOCUMENTS 4,749,067 6/1988 Stevens .............................. 188/171

FOREIGN PATENT DOCUMENTS 2549807 5/1977 Fed. Rep. of Germany ........ 269/63
558708 3/1973 Switzerland ........................ 269/63

Primary Examiner—Robert C. Watson
Attorney, Agent, or Firm—Armstrong, Nikaido, Marmelstein, Kubovcik & Murray

[57] ABSTRACT

A rotational positioning device of this invention comprises a rotary table for supporting a work, a servo motor including a rotor which secures the rotary table, a rotational angle detecting means for detecting the rotational position of the rotary table, and a brake mechamism for braking the rotation of the rotary table. The servo motor, rotational angle detecting means, and brake mechanism are accommodated in a casing. The rotary table is directly driven by the servo motor without intervention of a speed reducer. Accordingly, the device is small in size and easy to handle, is capable of high-speed rotational positioning and very accurate positioning, and provides a high degree of safety because the brake mechanism is built in.

4 Claims, 5 Drawing Sheets 4,899,998

ROTATIONAL POSITIONING DEVICE

FIELD OF THE INVENTION AND RELATED ART STATEMENT

This invention relates to a rotational positioning device and more particularly, to an improvement of the rotational positioning device which is used in indexing the angle at a high degree of accuracy in the field of automated machines for semiconductor manufacturing-/assembling, or of measuring, controlling, and testing machines for image processing/inspecting.

In general, this type of rotational positioning device comprises a rotary table for supporting a work or an article to be measured, a driving means for the rotary table, a rotational angle detecting means for detecting the rotational angle of the rotary table, and a brake mechanism for braking the rotary table. The drive system of the driving means includes a cam speed-reduction drive type, a gear/worm speed-reduction drive type, etc. The typical conventional rotational positioning device incorporates therein the worm speed-reduction drive system as shown in FIG. 10, which is featured in that a rotary table b for supporting a work a is rotatably supported by an index drive c, and this index drive c and a motor d serving as a drive source are connected by a speed reducer (worm speed reducer) e, a brake mechanism (electromagnetic brake) f, and a transmission mechanism (pulley h and belt i) g.

Therefore, the problems of the foregoing type of rotational positioning device of the prior art are that the speed of rotation of positioning is slow since the rotary table b is driven with intervention of the speed reducer e, the rotational angle detecting means must be provided externally, and a memory unit is needed since an open-loop control mode is employed, thus the components are increased and the size of the device itself is enlarged. Further problems are a low degree of resolution, the difficulty of indexing the angle accurately, etc.

In view of such circumstances, there has been demanded the development of small-sized rotational positioning devices of high rotational positioning speed which are also capable of achieving the indexing of angle at a high degree of accuracy.

OBJECT AND SUMMARY OF THE INVENTION

Therefore, it is an object of the present invention to provide a rotational positioning device which comprises a servo motor for directly driving a rotary table without intervention of a speed reducer, a rotational angle detecting means, and a brake mechanism, all accommodated in its casing.

It is another object of the present invention to provide a superior rotational positioning device which is small in size and easy to handle, is capable of high-speed rotational positioning and very accurate positioning, and provides a high degree of safety because a brake mechanism is built in.

It is still another object of the present invention to provide a rotational positioning device which is featured in that the rotational angle of a rotary table is detected by a rotational angle detecting means when the rotary table is rotated by energizing a servo motor after a work is supported by the rotary table, and the rotational positioning of the work is achieved as the servo motor is controlled on the basis of the thus detected signal.

That is, the present invention resides in a rotational positioning device which comprises a rotary table for supporting a work, a servo motor including a rotor which secures the rotary table, a rotational angle detecting means for detecting the rotational position of the rotary table, and a brake mechanism for braking the rotation of the rotary table, wherein the servo motor, rotational angle detecting means, and brake mechanism are accommodated in a casing.

In the present invention, the rotational angle detecting means may be of any type as far as it can detect the rotational angle of the rotary table, but, preferably is an encoder which comprises a light shielding board secured to the rotor of the servo motor and an optional sensor for optically detecting a mark on the light shielding board.

Further, the brake mechanism may be of any type as far as it can brake the rotation of the rotary table when needed, but, preferably is an electromagnetic brake which comprises an armature detachable with respect to a disc secured to the rotor of the servo motor and a solenoid capable of attracting the armature in opposition to a spring means for normally pressing the armature against the disc.

As described above, accommodated in the casing are the servo motor including the rotor which secures the rotary table for supporting a work, the rotational angle detecting means for detecting the rotational position of the rotary table, and the brake mechanism for braking the rotation of the rotary table; therefore, the rotational angle of the rotary table is detected by the rotational angle detecting means as the rotary table is rotated by energizing the servo motor after a work is supported by the rotary table, and the rotational positioning of the work is achieved as the servo motor is controlled on the basis of the thus detected signal.

DETAILED DESCRIPTION OF THE PREFERRED EMBODIMENT

The present invention will now be described in greater detail with reference to an embodiment shown in the accompanying drawings.

Figure 1:
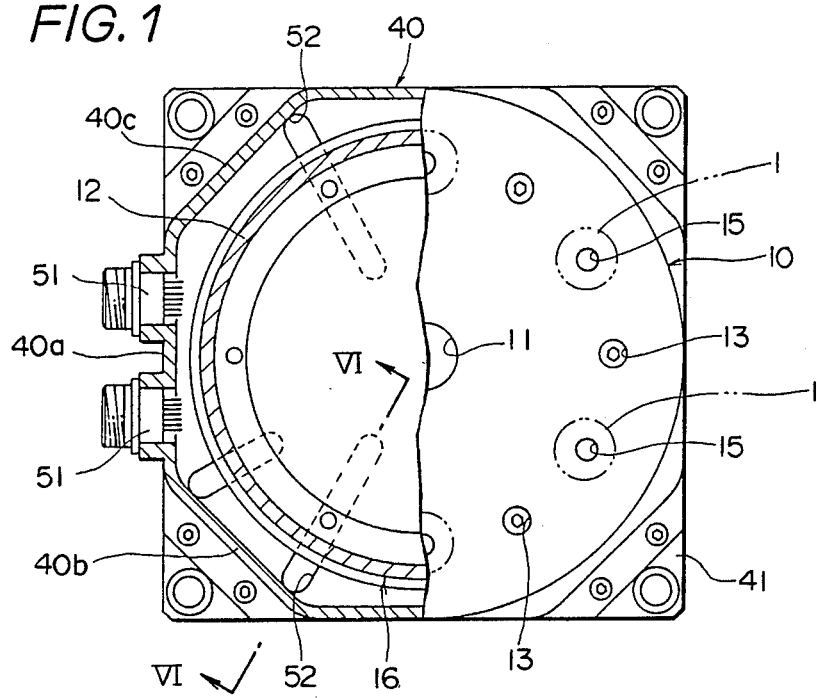
FIG. 1 is a plan view, partly in cross section, showing a portion of a rotational positioning device according to the present invention.
Figure 2:
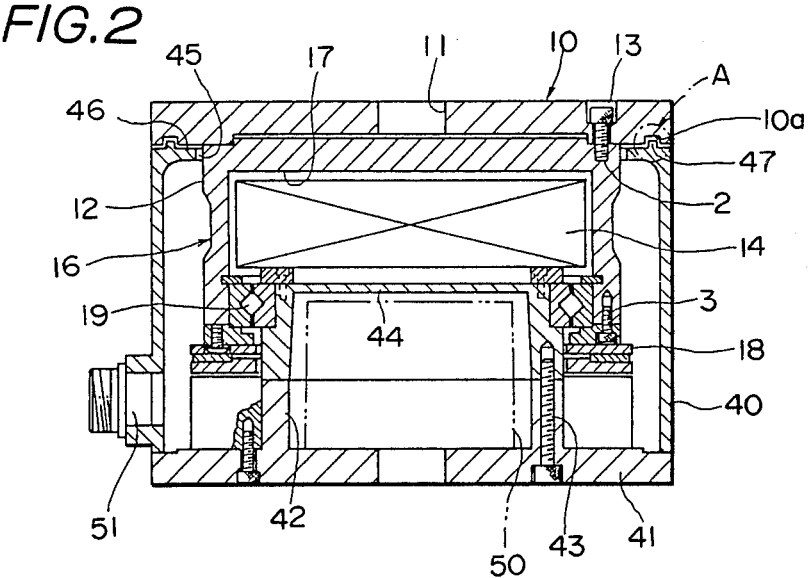
FIG. 2 is a vertical sectional view corresponding to FIG. 1.
Figure 3:
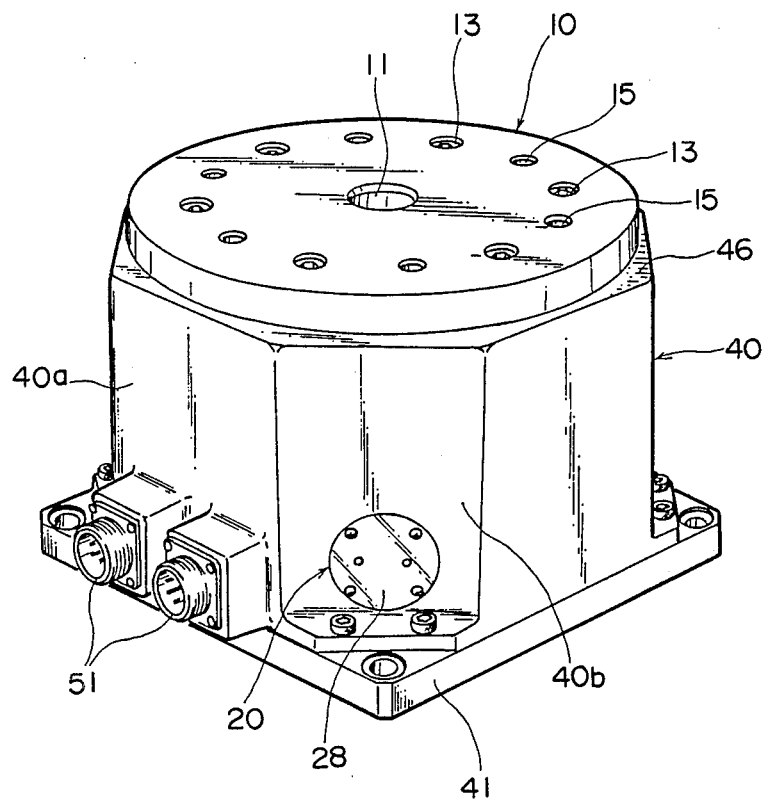
FIG. 3 is a perspective view of the rotational positioning device.

FIG. 1 is a plan view, partly in cross section, showing a portion of a rotational positioning device according to the present invention, FIG. 2 is a vertical sectional view corresponding to FIG. 1, and FIG. 3 is a perspective view of the rotational positioning device.

The rotational positioning device of the present invention comprises a rotary table 10 for supporting a work 1, a servo motor 16 including a rotor 12 which secures the rotary table 10, a rotational angle detecting means 20 for detecting the rotational position of the rotary table 10, and a brake mechanism 30 for braking the rotation of the rotary table 10, wherein the servo motor 16, rotational angle detecting means 20, and brake mechanism 30 are accommodated in a casing 40.

The rotary table 10 has a through hole 11 for device wiring, bored at the center thereof and further, attaching holes 13, 13, ... for securing the rotary table and other attaching holes 15, 15, ... for supporting works, bored alternately at appropriate intervals on a circle concentric with the through hole 11.

The servo motor 16 comprises a bottom-provided cylindrical rotor 12 and a stator 14 disposed inside a cavity portion 17 of the rotor 12, which is adapted to undertake an open-loop control mode. In the servo motor 16, the rotary table 10 is secured on the upper/outer side of the rotor 12 by rotor securing bolts 2, a disc 18 is secured on the under/opening side by attaching bolts 3, and the stator 14 is secured to a sectionally U-shaped attaching seat 44 which is in turn secured by securing bolts 43 to the upper edge of a cylindrical attaching ridge 42 projecting upward from a base 41. Further, a turning roller bearing 19 is interposed between the inner surface on the opening side of the rotor 12 of the motor 16 and the outer surface of the attaching seat 44 so that the rotor 12 and the rotary table 10 can rotate freely.

Figure 4:
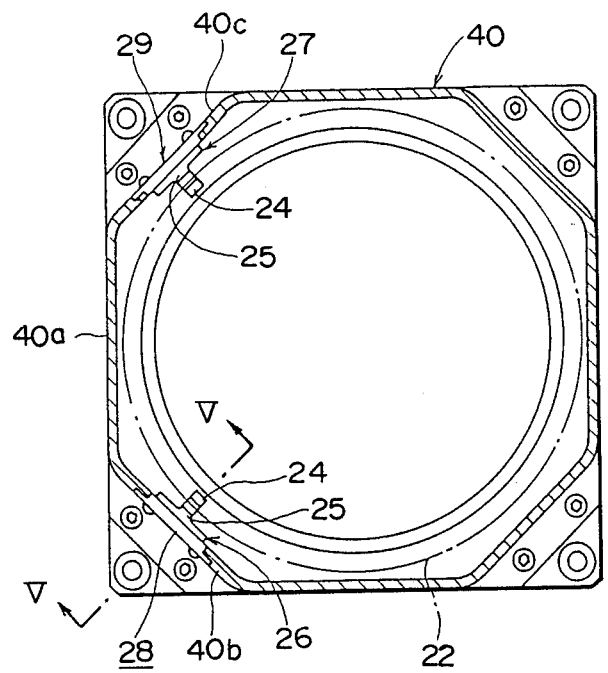
FIG. 4 is a horizontal sectional view showing the mounted state of a rotational angle detecting means in the present invention.
Figure 5:
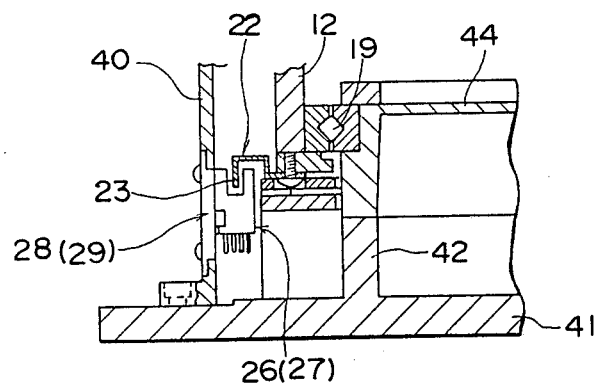
FIG. 5 is a sectional view taken along line V—V in FIG. 4.
Figure 6:
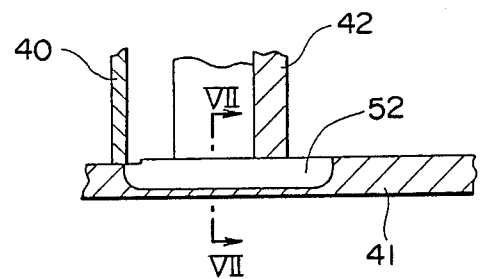
FIG. 6 is a sectional view taken along line VI—VI in FIG. 1.
Figure 7:
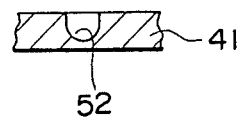
FIG. 7 is a sectional view taken along line VII—VII in FIG. 6.

As shown in FIGS. 4 and 5, the rotational angle detecting means 20 is made of an encoder which comprises a light shielding board 22 secured to the side-wall opening portion of the rotor 12 of the servo motor 16 by securing screws 21, and an origin detecting unit 28 and an overrun detecting unit 29 in the form of sensors 26 and 27 each of which includes a light emitting element 24 and a light receiving element 25 disposed so as to face each other with interposition of a U-shaped folded portion 23 formed on the margin of the light shielding board 22, so that a mark (not shown) provided on the U-shaped folded portion 23 are optically detected by cooperation of the light emitting elements 24 and the light receiving elements 25 of these detecting units 28 and 29. Here, the origin detecting unit 28 and the overrun detecting unit 29 may be disposed at one spot.

Figure 9:
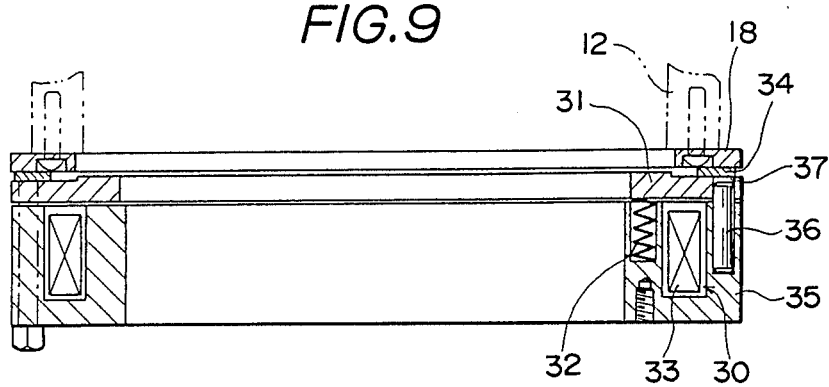
FIG. 9 is a sectional view showing a brake mechanism in the present invention.
Figure 10:
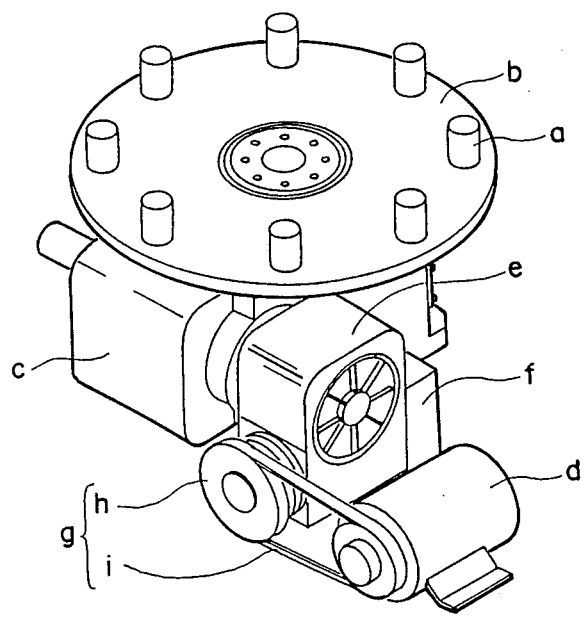
FIG. 10 is a perspective view showing a conventional rotational positioning device.

As shown in FIG. 9, the brake mechanism 30 is made of an electromagnetic brake which comprises an armature 31 detachable with respect to the disc 18 secured to the rotor 12 of the servo motor 16 and a solenoid 33 capable of attracting the armature in opposition to a spring 32 serving as a spring means for normally pressing the armature 31 against the disc 18. Specifically, the surface of the armature 31 which faces the disc 18 has a liner 34 attached thereto, and the armature 31 is bored with guide holes 37 which slidably fit with guide pins 36 provided in a fixing portion 35 in which the solenoid 33 is provided also, so that the contact/detach motion of the armature 33 resulting from the energization/deenergization of the solenoid 33 is stabilized.

Figure 8:
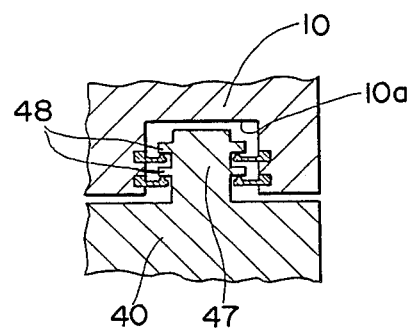
FIG. 8 is an enlarged sectional view of the portion A of FIG. 2.

On the other hand, the casing 40 is made in the form of an octagonal cylinder with its top portion 46 having an opening portion 45 which loosely accepts the rotor 12 of the servo motor 16, a ridge 47 circumferentially provided on the upper surface of the top portion 46 fits rotatably with a groove 10a formed in the opposing surface of the rotary table 10, and a labyrinth seal 48 is interposed between the ridge 47 and the groove 10a in their opposing areas, as shown in FIG. 8, so that the servo motor 16, rotational angle detecting means 20, and electromagnetic brake 30 accommodated in the casing 40 can be protected from external dust. Further, one side wall of the casing 40 has connectors 51 attached thereto which are used in wiring (not shown) the solenoid 33 of the electromagnetic brake 30 with a control unit 50 disposed in the cavity portion 17 defined by the attaching ridge 42 and the attaching seat 44, and the sensors 26 and 27 for the origin detecting unit 28 and the overrun detecting unit 29 are attached, respectively, to side walls 40b and 40c disposed on either side of the side wall 40a to which the connectors 51 are attached.

Further, a plurality of grooves 52 are formed at appropriate positions in the upper surface of the base 41 so as to pass under the attaching ridge 42, so that cords (not shown) for connecting the connectors 51 and the control unit 50 are laid in these grooves 52.

The function of indexing the rotational angle of the work 1 using the rotational positioning device configured as above of the present invention is performed as follows. After the work 1 is supported by the rotary table 10, the servo motor 16 is energized to rotate the rotary table 10, and the mark provided on the light shielding board 22 is detected by the sensor 27 of the origin detecting unit 28, whereby a reference position is established. Then, an operation signal is sent from the control unit 50 to the servo motor 16 to energize the servo motor 16, whereby the rotary table 10 is rotated, and a predetermined rotational angle is detected in terms of the signal of the encoder accommodated in the servo motor 16, whereby the positioning of the work 1 is achieved. Here, since the resolution pertaining to the rotational angle of positioning is 1/655360 per revolution, or about 1.98″, the positioning can be performed at a high degree of accuracy.

In case of emergency, e.g. where an electricity failure occurs during the positioning process, the solenoid 33 of the electromagnetic brake 30 is deenergized, so that the urging force of the spring 22 presses the armature 31 against the disc 18, whereby the rotary table 10 is stopped and rendered stationary. Accordingly, since the rotary table 10 is instantly stopped and rendered stationary in case of emergency, the safety is assured even where the work 1 supported on the rotary table 10 is projecting sideways from the rotary table 10. It should be noted that the mode of use of the rotational positioning device of the present invention is not necessarily limited to one horizontal state in which the rotary table 10 is located above the other part, and that the device can be used in any position, for example, in the other horizontal state in which the rotary table is located below the other part, or in the vertical state in which the rotary table 10 rotates in a vertical plane.

As described above, the rotational positioning device of the embodiment comprises the rotary table 10 for supporting the work 1, the servo motor 16 including the rotor 12 which secures the rotary table 10, the rotational angle detecting means 20 for detecting the rotational position of the rotary table 10, and the brake mechanism 30 for braking the rotation of the rotary table 10, wherein the servo motor 16, rotational angle detecting means 20, and brake mechanism 30 are accommodated in the casing 40; therefore, the device is small in size and easy to handle, is capable of high-speed rotational positioning and very accurate positioning, and provides a high degree of safety because the brake mechanism is built in.

While the invention has been particularly shown and described in reference to preferred embodiments thereof, it will be understood by those skilled in the art that changes in form and details may be made therein without departing from the spirit and scope of the invention.

What is claimed is:

1. A rotational positioning device, comprising a rotary table for supporting a work piece ; a servo motor including a rotor which secures said rotary table ; a rotational angle detecting means for detecting the rotational position of said rotary table, wherein said rotational angle detecting means has a first portion coupled to said rotor and a second portion having a detector which detects a mark on said first portion; and a brake means for braking the rotation of said rotary table, wherein said servo motor, said rotational angle detecting means, and said brake means are accommodated in a casing.

2. A rotational positioning device according to claim 1, wherein said brake means is an electromagnetic brake which comprises an armature detachable relative to a disc secured to said rotor of said servo motor, and a solenoid capable of attracting said armature in opposition to a spring means for normally pressing said armature against said disc.

3. A rotational positioning device, comprising a rotary table for supporting a work piece; a servo motor including a rotor which secures said rotary table; a rotational angle detecting means for detecting the rotational position of said rotary table, wherein said rotational angle detecting means is an encoder which comprises a light shielding board secured to said rotor of said servo motor and an optical sensor for optically detecting a mark on said light shielding board; and a brake means for braking the rotation of said rotary table, wherein said servo motor, said rotational angle detecting means, and said brake means are accommodated in a casing.

4. A rotational positioning device according to claim 3, wherein said brake means is an electromagnetic brake which comprises an armature detachable relative to a disc secured to said rotor of said servo motor, and a solenoid capable of attracting said armature in opposition to a spring means for normally pressing said armature against said disc.

* * * * *